(12) United States Patent
Aono et al.

(10) Patent No.: US 7,404,632 B2
(45) Date of Patent: Jul. 29, 2008

(54) INK-JET RECORDING INK AND IMAGE FORMING METHOD

(75) Inventors: Toshiaki Aono, Shizuoka-ken (JP); Kenji Ikeda, Shizuoka-ken (JP)

(73) Assignee: FUJIFILM Corporation, Tokyo (JP)

( * ) Notice: Subject to any disclaimer, the term of this patent is extended or adjusted under 35 U.S.C. 154(b) by 443 days.

(21) Appl. No.: 10/767,062

(22) Filed: Jan. 30, 2004

(65) Prior Publication Data

US 2004/0239740 A1    Dec. 2, 2004

(30) Foreign Application Priority Data

Jan. 31, 2003    (JP) ............... 2003-24004

(51) Int. Cl.
*C09D 11/00* (2006.01)
(52) U.S. Cl. .................... 347/100; 106/31.13; 106/31.6
(58) Field of Classification Search ................ 347/100; 106/31.13, 31.6
See application file for complete search history.

(56) References Cited

U.S. PATENT DOCUMENTS

| | | | |
|---|---|---|---|
| 5,753,422 A * | 5/1998 | Shibahara et al. | 430/379 |
| 6,048,660 A * | 4/2000 | Leppard et al. | 430/270.1 |
| 6,068,963 A * | 5/2000 | Aoshima | 430/270.1 |
| 6,509,125 B1 | 1/2003 | Ito et al. | |
| 6,521,031 B2 * | 2/2003 | Kimura et al. | 106/31.47 |
| 2002/0060727 A1 * | 5/2002 | Nishita | 347/100 |
| 2002/0067399 A1 | 6/2002 | Yabuki et al. | |
| 2002/0075369 A1 * | 6/2002 | Ota et al. | 347/100 |
| 2002/0077385 A1 * | 6/2002 | Miyabayashi | 523/160 |
| 2002/0143079 A1 * | 10/2002 | Yamanouchi et al. | 523/160 |
| 2003/0061965 A1 | 4/2003 | Taguchi | |
| 2003/0235707 A1 * | 12/2003 | Aono | 428/500 |
| 2004/0189764 A1 | 9/2004 | Aono et al. | |
| 2005/0073563 A1 * | 4/2005 | Hanaki et al. | 347/100 |

FOREIGN PATENT DOCUMENTS

| | | |
|---|---|---|
| JP | 54-130620 A | 10/1979 |
| JP | 58-108207 A | 6/1983 |
| JP | 04-185673 A | 7/1992 |
| JP | 07-219113 A | 8/1995 |
| JP | 07268254 | 10/1995 |
| JP | 09-176543 A | 7/1997 |
| JP | 10-095942 A | 4/1998 |
| JP | 10110126 | 4/1998 |
| JP | 2001-172532 A | 6/2001 |
| JP | 2001181548 | 7/2001 |
| JP | 2002088294 | 3/2002 |
| JP | 2002-161225 A | 6/2002 |
| JP | 2002-249695 A | 9/2002 |
| JP | 2002-322399 A | 11/2002 |
| JP | 2003-084381 A | 3/2003 |

* cited by examiner

*Primary Examiner*—Manish S. Shah
*Assistant Examiner*—Laura E. Martin
(74) *Attorney, Agent, or Firm*—Sughrue Mion, PLLC

(57) ABSTRACT

The present invention relates to an ink-jet recording ink, containing a pigment and a compound represented by the General formula (I):

$$R-X-(Y)_n-H \qquad \text{General formula (I)}$$

wherein R represents a hydrophobic group, or a group derived from a hydrophobic polymer; X represents a bivalent linking group having a hetero bond; Y may be A, C or D, and $(Y)_n$ contains 0 to 40% by mole of a structural unit represented by B; and n=10-3500; $R^1$ represents H, or an alkyl group; $R^2$ represents H or an alkyl groups; $R^3$ represents H or a methyl group; and $R^4$ represents H, $-CH_3$, $-CH_2COOH$, or $-CN$; $Z^1$: H, $-COOH$, or $-CONH_2$; $Z^2$: $-COOH$, $-SO_3H$, $-OSO_3H$, $-CH_2SO_3H$, $-CONHC(CH_3)_2CH_2SO_3H$, or $-CONHCH_2CH_2CH_2N^+(CH_3)_3Cl^-$.

23 Claims, No Drawings

INK-JET RECORDING INK AND IMAGE FORMING METHOD

CROSS-REFERENCE TO RELATED APPLICATION

This application claims priority under 35 USC 119 from Japanese patent Application No. 2003-24004, the disclosure of which is incorporated by reference herein.

BACKGROUND OF THE INVENTION

1. Field of the Invention

The present invention relates to an ink-jet recording ink and an image forming method, specifically, an ink-jet recording ink comprising a pigment as a coloring component, and an image forming method using the ink-jet recording ink.

2. Description of the Related Art

The ink-jet recording method has been spreading and developing rapidly due to low costs for materials, high-speed recording, little noise at the time of the recording, and easy color recording provided by the method.

The ink-jet recording method includes the method of applying pressure to ink by means of a piezoelectric element to discharge droplets, the method of generating bubbles in ink by heating to discharge droplets, the method of using ultrasonic waves, and the method of absorbing and discharging droplets by electrostatic force. Various inks are used correspondingly to these methods.

As inks for ink-jet recording, water-based ink, oil-based ink, and solid (melting-type) ink are used. As coloring matters used in these inks, dyes and pigments are known. Output image formed with the ink comprising a dye has insufficient fastness, that is, storage stability of image after image formation is insufficient. Thus, the use of pigment ink, which generally has superior fastness and is hard to decolorize, has been investigated.

Pigment ink is usually produced by dispersing a water-insoluble organic pigment into an aqueous medium. The production process thereof generally comprises the step of adding the pigment to the aqueous medium containing surfactant and dispersing polymer and pulverizing the pigment with hard beads by a disperser such as a sand mill, a ball mill or the like. In this case, pigment particles having large particle sizes provide ink having unfavorable storage stability and discharging property. Accordingly, it has been a big problem to establish technique for obtaining a fine and stable pigment dispersion.

For solving such a problem, a method of obtaining an organic pigment particle dispersion with a particle size of 100 nm or smaller by means of a high-speed mill dispersion using dispersing media having a particle size of 100 μm or smaller (such as polymer beads having a size of 50 μm) has been reported. (see, for example, Japanese Patent Application Laid-Open (JP-A) No. 9-176543). In fact, a fine dispersed product can be obtained according to this method. However, according to the method, a large energy is consumed in the dispersion, the step of separating the dispersing liquid from the beads is necessary, and the process is complicated.

Another method for solving the problem comprises dissolving monomer molecules which constitute a pigment into a solution, and decreasing the solubility of the monomer molecules to precipitate pigment particles. This acid paste method, which is known as a method for producing pigment, comprises dissolving an organic pigment in concentrated sulfuric acid and adding this solution to water while the water is vigorously stirred to precipitate fine pigment particles. Another method for solving the problem is reported in which crude quinacridon is dissolved in dimethyl sulfoxide in the presence of caustic alkali and water and water is further added thereto to yield pigment particles (see, for example, JP-A No. 54-130620). In these methods, however, it is indispensable to remove the solvent (concentrated sulfuric acid and organic solvent) after the precipitation of the pigment particles. Thus, the methods are complicated as well.

There is also a method of dissolving a hydrophobic dye into a supercritical fluid and decreasing the solubility thereof to precipitate the hydrophobic dye, thereby producing a water-based ink (see, for example, JP-A No. 2001-172532). About dye-based ink, a technique of forming a clear image without white spots and dot irregularities, is also described (see, for example, JP-A No. 10-95942).

In all the above-mentioned methods, however, the finely-dispersed particles of some kinds of pigments aggregate immediately. Even the particles of pigments which are relatively stable aggregate little by little. Various kinds of dispersion stabilizers for preventing the aggregation of pigment particles are also suggested. However, stable dispersing quality has not yet been obtained.

In the case where ink containing pigment is used as ink-jet recording ink, there arises a problem that the ink remaining in nozzles in a printer precipitates so as to cause ink-clogging. Even if the nozzle wherein the ink-clogging is caused in this way is washed, it is not easy to remove the pigment which has precipitated and hardened. The ink-clogging is more easily caused as the pigment aggregates.

SUMMARY OF THE INVENTION

Considering the above-mentioned situation, the present invention is made for achieving the following objects.

A first object of the invention is to provide an ink-jet recording ink in which dispersed particles have small particle sizes and excellent dispersion stability so as to suppress the generation of ink-clogging in nozzles, wherein generated ink-clogging can be easily removed.

A second object of the invention is to provide an image forming method by which high-quality images are formed stably without image quality deterioration or image formation failure caused by ink-discharging failure, wherein the ink-jet recording ink is used in the method.

Specific means for solving the above-mentioned problems is as follows.

A first aspect of the invention is to provide an ink-jet recording ink (S), comprising a pigment and a compound represented by the following general formula (I):

General formula (I)

wherein in the general formula (I), R represents a hydrophobic group, or a group derived from a hydrophobic polymer; X represents a bivalent linking group having a hetero bond; n is an integer from 10 to 3500; and structural units of repeated Y comprise at least one structural unit represented by A, C or D, and further comprise 0 to 40% by mole of structural units represented by B:

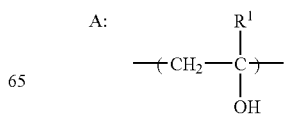

-continued

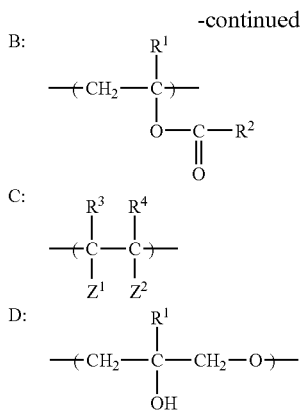

wherein in structural units A through D, $R^1$ represents a hydrogen atom or an alkyl group having 1 to 6 carbon atoms; $R^2$ represents a hydrogen atom or an alkyl group having 1 to 10 carbon atoms; $R^3$ represents a hydrogen atom or a methyl group; $R^4$ represents a hydrogen atom, —$CH_3$, —$CH_2COOH$ or an ammonium salt thereof or alkali metal salt thereof, or —CN; $Z^1$ represents a hydrogen atom, —COOH or an ammonium salt thereof or alkali metal salt thereof, or —$CONH_2$; and $Z^2$ represents —COOH or an ammonium salt thereof or alkali metal salt thereof, —$SO_3H$ or an ammonium salt thereof or alkali metal salt thereof, —$OSO_3H$ or an ammonium salt thereof or alkali metal salt thereof, —$CH_2SO_3H$ or an ammonium salt thereof or alkali metal salt thereof, —$CONHC(CH_3)_2CH_2SO_3H$ or an ammonium salt thereof or alkali metal salt thereof, or —$CONHCH_2CH_2CH_2N^+(CH_3)_3Cl^-$.

A second aspect of the invention is to provide the ink-jet recording ink (S), wherein the hydrophobic group represented by R in the general formula (I) is an aliphatic group or an aromatic group.

A third aspect of the invention is to provide the ink-jet recording ink (S), wherein the hydrophobic group represented by R in the general formula (I) is an alicyclic group.

A fourth aspect of the invention is to provide the ink-jet recording ink (S), wherein the hydrophobic group represented by R in the general formula (I) is selected from the group consisting of alkyl, alkenyl, alkynyl, phenyl and naphthyl groups.

A fifth aspect of the invention is to provide the ink-jet recording ink (S), wherein the hydrophobic group represented by R in the general formula (I) is an alkyl group having 3 to 70 carbon atoms.

A sixth aspect of the invention is to provide the ink-jet recording ink (S), wherein R in the general formula (I) is a group derived from at least one hydrophobic polymer selected from the group consisting of polystyrene, polymethacrylic acid ester, polyacrylic acid ester, polyvinyl chloride, and derivatives thereof.

A seventh aspect of the invention is to provide the ink-jet recording ink (S), wherein R in the general formula (I) is a group derived from at least one hydrophobic polymer selected from the group consisting of polystyrene, polymethacrylic acid ester, polyacrylic acid ester, polyvinyl chloride, and derivatives thereof, and a polymerization degree of R in the general formula (I) is from 2 to 500.

A eighth aspect of the invention is to provide the ink-jet recording ink (S), wherein the hetero bond in X in the general formula (I) is selected from the group consisting of an ether bond, an ester bond, a thioether bond, a thioester bond, a sulfonyl bond, an amide bond, an imide bond, a sulfonamide bond, a urethane bond, a urea bond, and a thiourea bond.

An ninth aspect of the invention is to provide the ink-jet recording ink (S), wherein the structural unit A is a structural unit derived from vinyl alcohol, α-methylvinyl alcohol, or α-propylvinyl alcohol.

A tenth aspect of the invention is to provide the ink-jet recording ink (S), wherein the structural unit B is a structural unit derived from vinyl acetate, vinyl formate, vinyl propionate, or an α-substitution product thereof.

A eleventh aspect of the invention is to provide the ink-jet recording ink (S), wherein the structural unit C is a structural unit derived from acrylic acid, methacrylic acid, itaconic acid, maleic acid, an ammonium salt thereof, or a metal salt thereof.

An twelfth aspect of the invention is to provide the ink-jet recording ink (S), wherein the structural unit D is selected from the group consisting of —$CH_2CH(OH)CH_2O$—, —$CH_2C(CH_3)(OH)CH_2O$—, and —$CH_2C(C_2H_5)(OH)CH_2O$—.

A thirteenth aspect of the invention is to provide the ink-jet recording ink (S), wherein a mass ratio of R to $(Y)_n$ in the general formula (I) is from 0.01 to 2, the mass ratio being calculated using atomic weights of respective atoms in R and $(Y)_n$.

A fourteenth aspect of the invention is to provide the ink-jet recording ink (S), wherein $(Y)_n$ in the general formula (I) comprises, as a structural unit thereof, ethylene, propylene, isobutene, acrylonitrile, acrylamide, methacrylamide, N-vinylpyrrolidone, vinyl chloride or vinyl fluoride.

A fifteenth aspect of the invention is to provide the ink-jet recording ink (S), further comprising water.

A sixteenth aspect of the invention is to provide the ink-jet recording ink (S), further comprising an water-soluble organic solvent.

A seventeenth aspect of the invention is to provide the ink-jet recording ink (S), further comprising a dispersing agent.

A eighteenth aspect of the invention is to provide the ink-jet recording ink (S), further comprising a drying inhibitor.

A nineteenth aspect of the invention is to provide the ink-jet recording ink (S), further comprising a penetration promoter.

A twentieth aspect of the invention is to provide the ink-jet recording ink (S), further comprising a high-boiling water-soluble solvent and a surface tension adjuster.

A twenty-first aspect of the invention is to provide the ink-jet recording ink (S), which has a surface tension of 20 to 60 mN/m.

A twenty-second aspect of the invention is to provide an image forming method, using the ink-jet recording ink (S) to form an image.

A twenty-third aspect of the invention is to provide an image forming method, using the ink-jet recording ink (S) to form an image, wherein the hydrophobic group represented by R in the general formula (I) is an aliphatic group or an aromatic group.

DETAILED DESCRIPTION OF THE INVENTION

The ink-jet recording ink of the present invention and the image forming method using this ink will be described in detail hereinafter.

The ink-jet recording ink of the invention comprises a pigment and a compound represented by the general formula (I), and generally comprises water. The ink may comprises a water-soluble organic solvent and other components in accordance with the necessity.

[Compound Represented by the General Formula (I)]

The ink-jet recording ink of the invention contains a compound represented by the following general formula (I). This compound is a water-soluble polymer having, at a terminal thereof, a hydrophobic group. This polymer suppresses the aggregation of the pigment, which is a hydrophobic dispersed matter, effectively and maintain a uniform and stable dispersion state thereof.

In other words, it is considered that the pigment in a dispersing medium is covered with the polymer in such a state that the surface of the pigment adsorbs the hydrophobic group of the polymer and the remaining water-soluble polymer moiety of the compound is oriented outwards, and in this way the pigment is dispersed uniformly and stably in the aqueous medium without aggregation. As a result, the dispersion stability of the pigment contained in the ink is improved. By the improved dispersion stability, instability and aggregation of the pigment during the storage of the ink over a long term can be suppressed, the particle size of the pigment can be maintained small, and the discharging failure of the ink or image-formation failure, which is caused by ink-clogging in the tip of a nozzle of a printer, can be prevented efficiently.

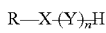    General formula (I)

In the general formula (I), R represents a hydrophobic group, or a group derived from a hydrophobic polymer.

The term "a group derived from a hydrophobic polymer" used herein refers to a group which includes a hydrophobic polymer and a group combining the hydrophobic polymer and X.

The hydrophobic group is preferably an aliphatic group (such as an alkyl, alkenyl, or alkynyl group), an aromatic group (such as a phenyl or naphthyl group), or an alicyclic group. These groups may be unsubstituted, or substituted with a substituent. Examples of the substituent include a halogen atom, and aliphatic, aromatic, alicyclic, heterocyclic, hydroxyl, cyano, nitro, N-substituted sulfamoyl, carbamoyl, acylamino, alkylsulfonylamino, arylsulfonylamino, alkoxy, aryloxy, aralkyl, and acyl groups.

In the case where the above-mentioned hydrophobic group is a substituted or unsubstituted aliphatic, aromatic or alicyclic group, the group is effectively adsorbed on the surface of the pigment, thereby making the affinity between the pigment and the present compound still higher. Therefore, such group has a particularly large effect of improving the dispersion stability of the pigment. Among these groups, a substituted or unsubstituted aliphatic group is preferable. Among aliphatic groups, an alkyl group having 3 to 70 carbon atoms is more preferable, an alkyl group having 4 to 50 carbon atoms is still more preferable, and an alkyl group having 8 to 24 carbon atoms is most preferable.

Preferable examples of the hydrophobic polymer include polystyrene and derivatives thereof, polymethacrylic esters (such as poly(methyl methacrylate)) and derivatives thereof, polyacrylic esters and derivatives thereof, water-insoluble vinyl polymers and vinyl copolymers including polybutene, polyvinyl chloride, polyvinyl acetate and polyvinyl versate as typical examples, water-insoluble polyoxyalkylenes such as polyoxypropylene and polyoxytetramethylene, and water-insoluble polymers such as polyamides and polyesters. Particularly preferable examples are polystyrene and derivatives thereof, polymethacrylic esters and derivatives thereof, polyacrylic esters and derivatives thereof, and polyvinyl chloride.

The polymerization degree of the hydrophobic polymer is preferably from 2 to 500, more preferably from 2 to 200, and particularly preferably from 2 to 100.

In the case where the above-mentioned R represents a hydrophobic group, the following examples (S-1 to S-51) thereof are preferable. In the invention, however, the compound represented by the general formula (I) is not limited to these examples.

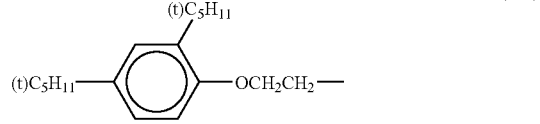
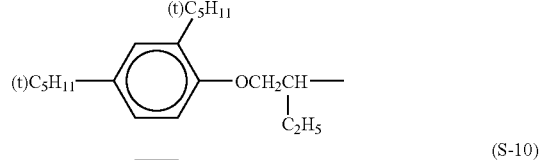
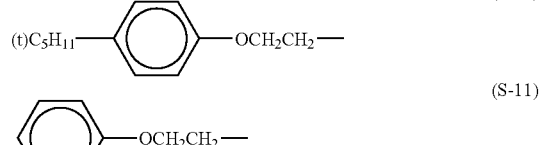
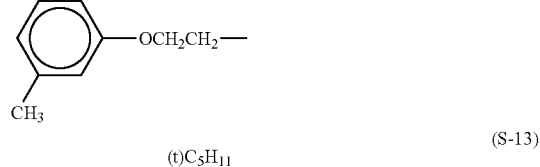
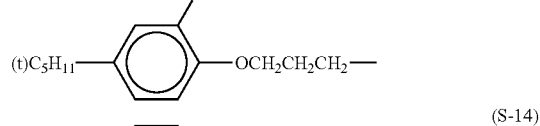
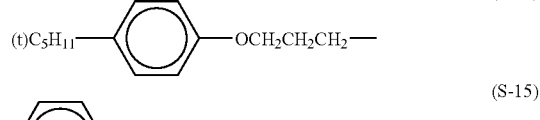
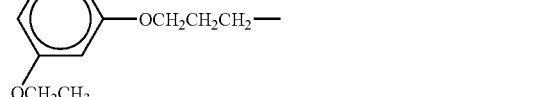

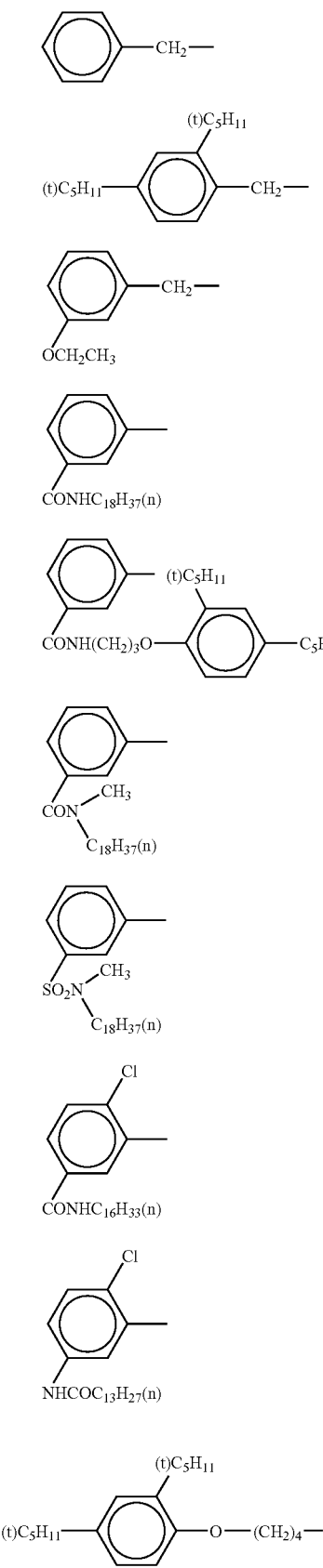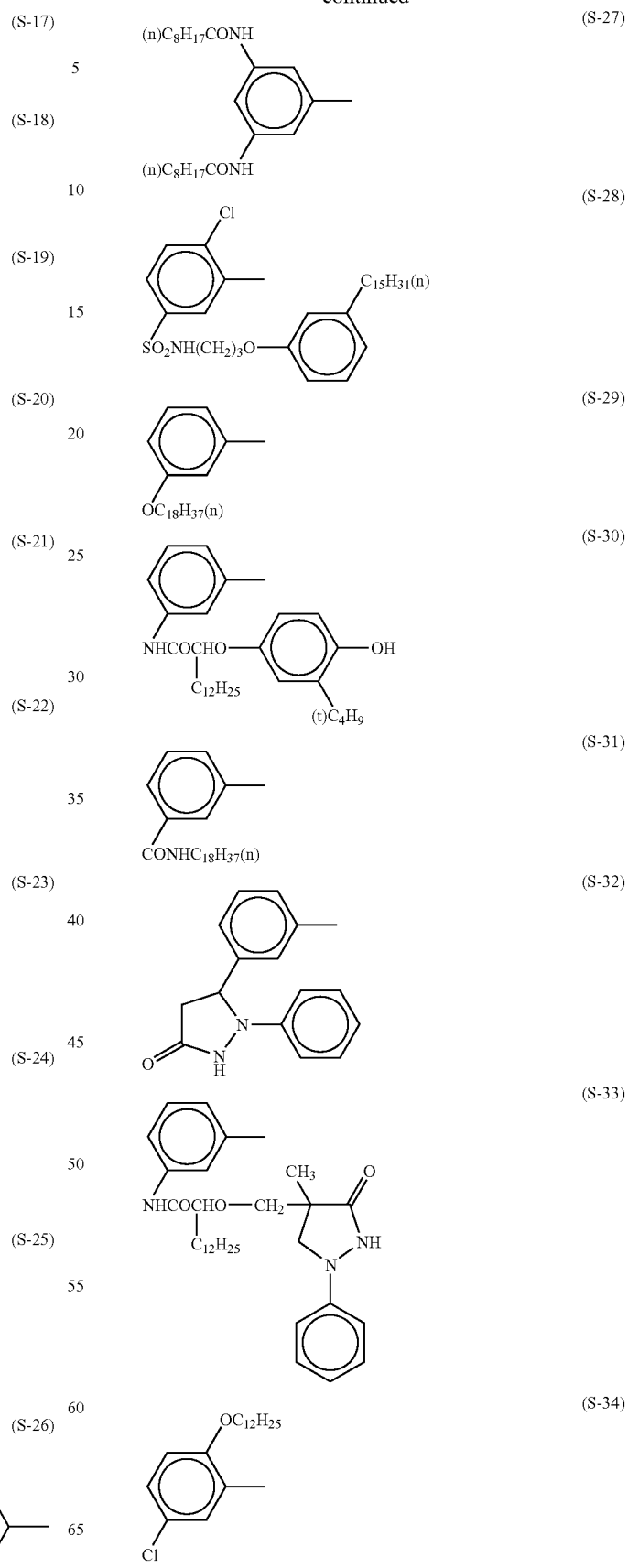

-continued

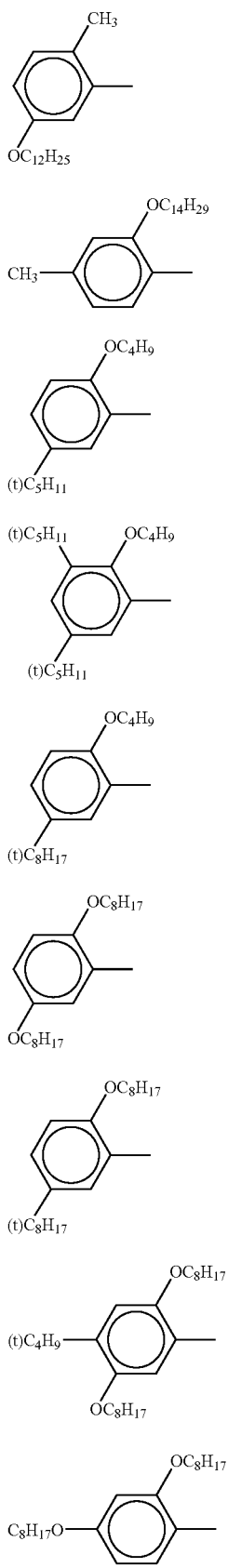

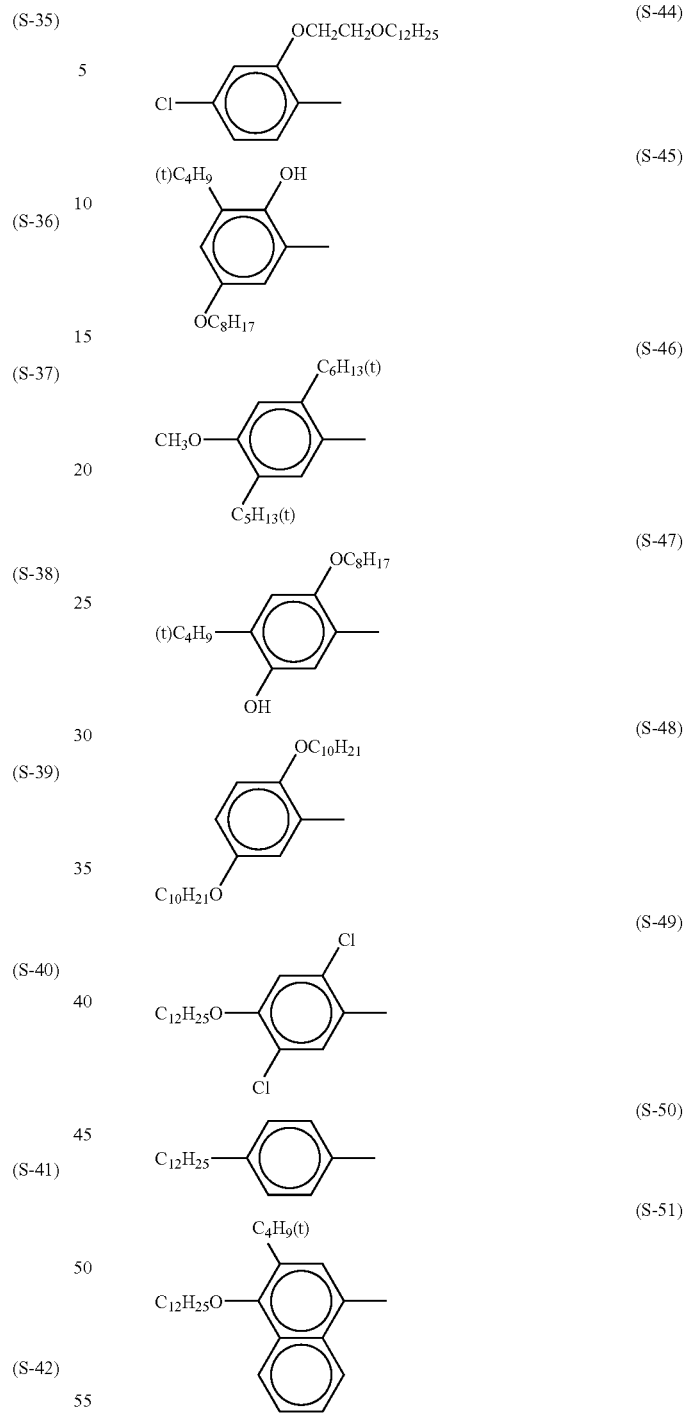

In the general formula (I), X represents a bivalent linking group having a hetero bond.

Examples of the bivalent linking group having a hetero bond include an ether bond, an ester bond, a thioether bond, a thioester bond, a sulfonyl group, an amide bond, an imide bond, a sulfonamide bond, a urethane bond, a urea bond, and a thiourea bond. From the viewpoint of advantage in synthesis or modification, an ether bond, an ester bond, a thioether bond, and a thioester bond are preferable. An ether bond, an ester bond, a thioether bond are more preferable.

In the general formula (I), structural units of repeated Y comprise at least one structural unit represented by the following formula A, C or D, and further comprise 0 to 40% by mole (with respect to the total structural units of repeated Y) of structural units represented by the following formula B:

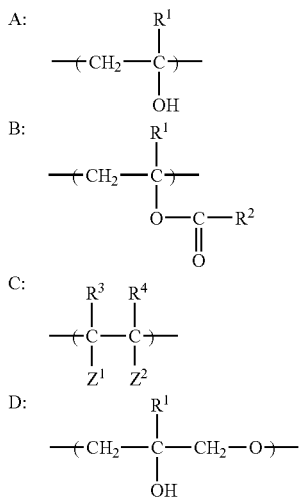

In the structure units A, B or D, $R^1$ represents a hydrogen atom or an alkyl group having 1 to 6 carbon atoms. The alkyl group having 1 to 6 carbon atoms is preferably a methyl group.

In the structural unit B, $R^2$ represents a hydrogen atom or an alkyl group having 1 to 10 carbon atoms. The alkyl group may be substituted with a substituent such as a hydroxyl, amide, carboxyl, sulfonic acid, sulfinic acid or sulfonamide group. The alkyl group having 1 to 10 carbon atoms is preferably a methyl group.

In the structural unit C, $R^3$ represents a hydrogen atom or a methyl group, and preferably represents a hydrogen atom. In the structural unit C, $R^4$ represents a hydrogen atom, —$CH_3$, —$CH_2COOH$ (or an ammonium salt thereof or an alkali metal salt thereof, or —CN, and preferably represents a hydrogen atom, or —$CH_2COOH$ (or an ammonium salt thereof or an alkali metal salt thereof).

In the structural unit C, $Z^1$ represents a hydrogen atom, —COOH (or an ammonium salt thereof or an alkali metal salt thereof), or —$CONH_2$, and preferably represents —COOH (or an ammonium salt thereof or an alkali metal salt thereof). $Z^2$ represents —COOH (or an ammonium salt thereof or an alkali metal salt thereof), —$SO_3H$ (or an ammonium salt thereof or an alkali metal salt thereof), —$OSO_3H$ (or an ammonium salt thereof or an alkali metal salt thereof), —$CH_2SO_3H$ (or an ammonium salt thereof or an alkali metal salt thereof), —$CONHC(CH_3)_2CH_2SO_3H$ (or an ammonium salt thereof or an alkali metal salt thereof), or —$CONHCH_2CH_2CH_2N^+(CH_3)_3Cl^-$, and preferably represents —COOH (or an ammonium salt thereof or an alkali metal salt thereof).

Examples of the structural unit A include structural units derived from vinyl alcohol, α-methylvinyl alcohol, or α-propylvinyl alcohol.

In this specification, reference to a structural unit "derived from" (a compound) refers to one structural unit having a suitable valence number obtained by removing a (suitable number of) hydrogen atom(s) from a compound.

Examples of the structural unit B include structural units derived from vinyl acetate, vinyl formate, vinyl propionate, or α-substitution products thereof.

Examples of the structural unit C include structural units derived from a monomer which undergoes ionic dissociation in water such as acrylic acid, methacrylic acid and crotonic acid (together with ammonium salts of the respective compounds and metal salts (such as Na and K) of the respective compounds); maleic acid or itaconic acid (together with monoalkyl esters of the respective compounds, ammonium salts of the respective compounds, and metal salts (such as Na and K) of the respective compounds); vinylphosphonic acid; vinylsulfuric acid; acrylsulfonic acid; methacrylsulfonic acid; 2-acrylamide-3-methylpropanesulfonic acid, and 2-methaacrylamide-3-methylpropanesulfonic acid (together with ammonium salts of the respective compounds and metal salts (such as Na and K) of the respective compounds); acrylamidepropyltrimethylammonium chloride; and methacrylamidepropyltrimethylammonium chloride.

Examples of the structural unit D include —$CH_2CH(OH)CH_2O$—, —$CH_2C(CH_3)(OH)CH_2O$—, and —$CH_2C(C_2H_5)(OH)CH_2O$—.

The structural unit A is preferably a structural unit derived from vinyl alcohol; the structural unit B is preferably a structural unit derived from vinyl acetate; the structural unit C is preferably a structural unit derived from a vinyl monomer containing acrylic acid (or an ammonium salt thereof or a metal salt (such as Na and K) thereof), a vinyl monomer containing methacrylic acid (or an ammonium salt thereof or a metal salt (such as Na and K) thereof), a vinyl monomer containing itaconic acid (or an ammonium salt thereof or a metal salt (such as Na and K) thereof) or a vinyl monomer containing maleic acid (or an ammonium salt thereof or a metal (such as Na and K) salt thereof); and the structural unit D is preferably —$CH_2CH(OH)CH_2O$—.

Among the above-mentioned structural units, a structural unit derived from vinyl alcohol (in the case of the structural unit A) and a structural unit derived from vinyl acetate (in the case of the structural unit B) are more preferable, and a structural unit derived from vinyl alcohol is most preferable.

In the general formula (I), n, the polymerization degree of Y, is an integer of 10 to 3500, preferably 10 to 2000, more preferably 10 to 1000, still more preferably 10 to 500, and most preferably 50 to 300. If n is less than 10, the water-solubility of the ink may become insufficient. If n is more than 3500, the dispersion stability of the pigment may deteriorate.

In the general formula (I), the proportions of the respective structural units A, B, C, and D in the water-soluble polymer moiety —$(Y)_n$— is not particularly limited except that the proportion of the structural unit B is 0 to 40% by mole (and the remainder comprises at least one of the structural units A, C, and D). For example, homopolymers of the respective structural units other than the structural unit B, and products obtained by copolymerizing at least two selected from the structural units A to D at arbitrary ratios (as far as the proportion of the structural unit B is 0 to 40% by mole), can be used.

Many compounds such as water-soluble compounds and water-dispersible compounds can be represented by the general formula (I). As far as the compound is water-soluble or water-dispersible, any structural unit other than the structural units A, B, C, and D may be further contained as Y. Examples of other such structural unit include structural units derived from ethylene, propylene, isobutene, acrylonitrile, acrylamide, methacrylamide, N-vinylpyrrolidone, vinyl chloride, or vinyl fluoride.

In the compound represented by the general formula (I), the optimal chemical composition, the optimal molecular weight, and the optimal condition of other characteristics of the hydrophobic segment (R) and the hydrophilic segment (Y), which constitute the compound, vary based on the purpose the compound is used for. For all purposes, the mass ratio $(R/(Y)_n)$ of the hydrophobic segment to the hydrophilic segment preferably satisfies: $0.001 \leq R/(Y)_n \leq 2$, the mass ratio being calculated using atomic weights of respective atoms in R and $(Y)_n$. From the viewpoint of the dispersion stability effect of the compound, the mass ratio more preferably satisfies: $0.01 \leq R/Y \leq 1$.

Preferable and specific examples (exemplified compounds P-1 to P-18) of the compound represented by the general formula (I) are shown in Tables 1 and 2 by showing R, X, Y (structural unit A, B, C or D) and n (the polymerization degree of Y) specifically. In the invention, however, the compound is not limited to these examples.

The compound represented by the general formula (I) can easily be synthesized, for example, by methods described in JP-A Nos. 62-288643, 61-254237, 61-254238, 61-254239 and 61-254240. In the case that R in the general formula (I) is an alkyl group, for example, products with trade names of "MP-103", "MP-203", "MP102" and the like are commercially available from Kuraray Co., Ltd.

The content by percentage of the compound represented by the general formula (I) in the ink-jet recording ink is preferably from 1 to 50%, more preferably from 3 to 30%, and particularly preferably from 5 to 20% by mass with respect to the mass of the pigment, which will be described later. If the content by percentage of the compound represented by the general formula (I) with respect to the mass of the pigment in the ink-jet recording ink is less than 1% by mass, the compound is not sufficiently adsorbed on the surfaces of the

TABLE 1

| Exemplified compound | R | X | Y | | |
|---|---|---|---|---|---|
| | | | A [% by mole] | B [% by mole] | C, % by mole |
| P-1 | S-1 [*1] | —S— | 98 | 2 | |
| P-2 | S-1 [*1] | —S— | 88 | 12 | |
| P-3 | S-1 [*1] | —S— | 98 | 2 | |
| P-4 | n.$C_4H_9$— | —S— | 90 | 10 | |
| P-5 | t.$C_8H_{17}$— | —S— | 88 | 12 | |
| P-6 | n.$C_{30}H_{61}$— | —S— | 88 | 12 | |
| P-7 | n.$C_{18}H_{37}$— | —S— | 98 | 2 | |
| P-8 | $C_{12}H_{25}$ (branched)- | —S— | 98 | 2 | |
| P-9 | Poly(methyl methacrylate) | —S— | 94.5 | 2.5 | $-(CH_2-CH(CONHC(CH_3)_2-CH_2SO_3Na))-, 3$ |
| P-10 | Polystyrene | —S— | 93.6 | 1.4 | $-(CH_2-CH(COONa)-)-, 5$ |
| P-11 | Polyoxypropylene | —S— | 79.1 | 15.9 | $-(CH_2-C(CH_2COONa)(COONa))-, 5$ |
| P-12 | Polystyrene | —S— | 89.7 | 0.3 | $-(CH_2-C(CH_2COONa)(COONa))-, 10$ |

A) $-(CH_2-CH(OH))-$
B) $-(CH_2-CH(OCOCH_3))-$
*1 S-1 is a hydrophobic group illustrated above.

TABLE 2

| Exemplified Compound | R | X | Y (Polymerization Degree) |
|---|---|---|---|
| P-13 | S-1 | —C(=O)—O— | —$CH_2$—CH(OH)—$CH_2$—O— (10) |
| P-14 | $C_8H_{17}$— | —C(=O)—O— | —$CH_2$—CH(OH)—$CH_2$—O— (10) |
| P-15 | $C_{10}H_{21}$— | —C(=O)—O— | —$CH_2$—CH(OH)—$CH_2$—O— (10) |
| P-16 | $C_{18}H_{37}$— | —C(=O)—O— | —$CH_2$—CH(OH)—$CH_2$—O— (10) |
| P-17 | S-1 | —C(=O)—O— | —$CH_2$—CH(OH)—$CH_2$—O— (20) |
| P-18 | S-1 | —O— | —$CH_2$—CH(OH)—$CH_2$—O— (20) |

*1: S-1 is a hydrophobic group illustrated above.

pigment particles so that the pigment particles may aggregate. If the content is more than 50% by mass, the viscosity of the ink may becomes too high so that the discharging property of the ink may deteriorate.

[Pigment]

The ink-jet recording ink of the invention comprises a pigment as a coloring component. The kind of the pigment is not particularly limited, and can be appropriately selected from organic pigments and inorganic pigments known in the prior art. Organic pigments are preferable. Specific examples thereof include quinacridon pigments, quinacridonquinone pigments, dioxazine pigments, phthalocyanine pigments, anthrapyrimidine pigments, anthanthrone pigments, indanthrone pigments, flavanthrone pigments, perylene pigments, diketopyrrolopyrrole pigments, perynone pigments, quinophthalone pigments, anthraquinone pigments, thioindigo pigments, benzimidazolone pigments, isoindolinone pigments, azomethine pigments, azo lake pigments, azo pigments, basic dye type lake pigments, acidic dye type lake pigments, nitro pigments, nitroso pigments, aniline black, carbon black and daylight fluorescent pigments. Among these pigments, quinacridon pigments, phthalocyanine pigments, azo pigments, anthraquinone pigments and carbon black are preferable.

The content by percentage of the pigment in the ink-jet recording ink is preferably from 0.1 to 20% by mass, more preferably from 0.5 to 15% by mass with respect to the whole mass of the ink.

[Water and Water-soluble Organic Solvent]

The ink-jet recording ink of the invention generally comprises water or a water-soluble organic solvent, or comprises water and a water-soluble organic solvent. Preferably, the ink comprises both water and a water-soluble organic solvent in order to dissolve a drying inhibitor, a penetration promoter, or the like, which will be described later.

The water-soluble organic solvent is preferably a water-soluble organic solvent having a lower vapor pressure than water. Specific examples thereof include polyhydric alcohols such as ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin, and trimethylolpropane; lower alkyl ethers of polyhydric alcohols, such as ethylene glycol monomethyl ether, ethylene glycol monoethyl ether, diethylene glycol monomethyl ether, diethylene glycol monoethyl ether, triethylene glycol monoethyl ether, and triethylene glycol monobuthyl ether; heterocycles such as 2-pyrrolidone, N-methyl-2-pyrrolidone, 1,3-dimethyl-2-imidazolidinone, and N-ethylmorpholine; sulfur-containing compounds such as sulfolane, dimethylsulfoxide and 3-sulfolene; and polyfunctional compounds such as diacetone alcohol, and diethanolamine. Among these compounds, polyhydric alcohols such as glycerin and diethylene glycol are preferable.

The above-mentioned water-soluble organic solvents may be used alone or in combination. The ink-jet recording ink preferably contains the water-soluble organic solvent(s) in an amount of 10 to 50% by mass.

The ink-jet recording ink of the invention can be obtained by preparing a water dispersion containing the pigment and the compound represented by the general formula (I) and adding thereto various additives, which will be described below, in appropriate amounts known in the art.

[Other Additives]

The ink of the invention may comprise a dispersing agent for dispersing the pigment in order to improve the dispersion stability of the pigment. Examples of the dispersing agent include various surfactants and dispersing polymers (copolymers having a hydrophilic moiety and a hydrophobic moiety). Examples of the surfactants include the compounds which will be described below as examples of an ink surface tension adjuster.

Examples of the additives other than the dispersing agent include a drying inhibitor for preventing ink-clogging in a nozzle for discharging the ink, a penetration promoter for allowing the ink to penetrate easily into paper, an antioxidant, a viscosity adjuster, a surface tension adjuster, a dispersant, a dispersion stabilizer, a fungicide, a rust inhibitor, a pH adjuster, an antifoamer, a chelating agent, and an ultraviolet ray absorber. These additives can be appropriately selected and used in an appropriate amount.

The drying inhibitor is preferably a water-soluble organic solvent which has a lower vapor pressure than water. Specific examples thereof include polyhydric alcohols such as ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin, and trimethylolpropane; lower alkyl ethers of polyhydric alcohols, such as ethylene glycol monomethyl ether, ethylene glycol monoethyl ether, diethylene glycol monomethyl ether, diethylene glycol monoethyl ether, triethylene glycol monoethyl ether, and triethylene glycol monobuthyl ether; heterocycles such as 2-pyrrolidone, N-methyl-2-pyrrolidone, 1,3-dimethyl-2-imidazolidinone, and N-ethylmorpholine; sulfur-containing compounds such as sulfolane, dimethylsulfoxide and 3-sulfolene; polyfunctional compounds such as diacetone alcohol, and diethanolamine; and urea derivatives. Among these compounds, polyhydric alcohols such as glycerin and diethylene glycol are preferable.

The drying inhibitors may be used alone or in combination. The ink-jet recording ink preferably contains 10 to 50% by mass of the drying inhibitor(s).

Examples of the penetration promoter which can be used include alcohols such as ethanol, isopropanol, butanol, di(tri)ethyleneglycol monobutyl ether, and 1,2-hexanediol; sodium laurylsulfate; sodium oleate; and nonionic surfactants. The penetration promoter(s) in an amount of 10 to 30% by mass with respect to the ink-jet recording ink gives sufficient effects. Preferably, the penetration promoter(s) is/are used in such an amount which do not cause printing blur or print-through.

The ultraviolet ray absorber is used in order to improve the storability of images, and examples thereof include benztriazole compounds described in JP-A Nos. 58-185677, 61-190537, 2-782, 5-197075, 9-34057 etc.; benzophenone compounds described in JP-A Nos. 46-2784 and 5-194483, U.S. Pat. No. 3,214,463 etc.; cinnamic acid compounds described in Japanese Patent Application Publication (JP-B) Nos. 48-30492 and 56-21141, JP-A No. 10-88106 etc.; triazine compounds described in JP-A Nos. 4-298503, 8-53427, 8-239368 and 10-182621, Japanese Patent Application National Publication (Laid-Open) No. 8-501291 etc.; the so-called fluorescent brighteners, that is, compounds which absorb ultraviolet rays to emit fluorescence, typical examples of which include compounds described in Research Disclosure No. 24239, stilbene compounds, and benzoxazole compounds.

Examples of the fungicide include sodium dehydroacetate, sodium benzoic acid, sodium pyridinethione-1-oxide, ethyl p-hyroxybenzoate, 1,2-benzisothiazoline-3-one and salts thereof. The ink-jet recording ink preferably comprises 0.02 to 1.00% by mass of the fungicide(s).

The pH adjuster can be used suitably for adjusting the pH of the colored fine particles dispersion or giving dispersion stability thereto. The pH adjuster is preferably added to set the pH at 4.5 to 10.0, more preferably 6 to 10.0. Examples of the pH adjuster include basic pH adjuster such as organic bases and inorganic alkalis, and acidic pH adjusters such as organic acids and inorganic acids.

Examples of the organic bases include triethanolamine, diethanolamine, N-methyldiethanolamine, and dimethylethanolamine. Examples of the inorganic alkalis include hydroxides of alkali metals (such as sodium hydroxide, lithium hydroxide, and potassium hydroxide), carbonates (such as sodium carbonate, and sodium hydrogencarbonate) and ammonia.

Examples of the organic acids include acetic acid, propionic acid, trifluoroacetic acid, and alkylsulfonic acid. Examples of the inorganic acids include hydrochloric acid, sulfuric acid, and phosphoric acid.

Examples of the surface tension adjuster include nonionic, cationic, and anionic surfactants. Examples of the anionic surfactant include aliphatic acid salts, alkylsulfates, alkylbenzenesulfonates, alkylnaphthalenesulfonates, dialkylsulfosuccinates, alkylphosphates, naphthalenesulfonic acid/formalin condensate, and polyoxyethylenealkylsulfates. Examples of the nonionic surfactant include polyoxyethylene alkyl ether, polyoxyethylene alkyl allyl ether, polyoxyethylene aliphatic acid esters, sorbitan aliphatic acid esters, polyoxyethylene sorbitan aliphatic acid esters, polyoxyethylene alkylamine, glycerin aliphatic acid esters, and oxyethylene oxypropylene block copolymer. It is also preferable to use SURFYNOLS (manufactured by Air Products & Chemicals Co.), which is an acetylene type polyoxyethylene oxide surfactant, or amineoxide type amphoteric surfactants such as N,N-dimethyl-N-alkylamineoxide. It is allowable to use surfactants described in JP-A No. 59-157636, pp. 37-38, and Research Disclosure No. 308119 (1989).

The surface tension of the ink-jet recording ink of the invention is preferably from 20 to 60 mN/m, more preferably from 25 to 45 mN/m, with or without the use of the surface tension adjuster. The viscosity of the ink is preferably 30 mPa·s or less, more preferably 20 mPa·s or less.

In the image forming method of the invention, the above-mentioned ink-jet recording ink of the invention is used to form a monochromatic or multicolored image.

The ink-jet recording ink of the invention can be used not only to form a monochromatic image but also to form a full color image. In order to form a full color image, a magenta tone ink, a cyan tone ink and a yellow tone ink can be used and a black tone ink for adjusting the color tone of the image may be used. It is preferable that at least one of these color tone inks is an ink-jet recording ink of the invention since a high-quality full color image, which is good in hue and has no streak or blur, can be formed. It is more preferable that all of these color tone inks are ink-jet recording inks of the invention since a high-quality and vivid full color image, which is good in hue and has no streak or blur, can be formed.

Examples of material on which image is to be formed and which is used for the image forming method using the ink-jet recording ink of the invention include plain paper, coated paper, and plastic films. In particular, when coated paper is used as the image-receiving material, image quality and image storage durability are improved.

The ink-jet recording ink of the invention can be used to form image on materials known as materials on which image is to be formed, such as plain paper, resin-coated paper, ink-jet papers described in documents such as JP-A Nos. 8-169172, 8-27693, 2-276670, 7-276789, 9-323475, 62-238783, 10-153989, 10-217473, 10-235995, 10-337947, 10-217597 and 10-337947, films, paper that can be used both for ink-jet recording and electrophotographic recording, cloth, glass, metal, and ceramics.

The materials on which image is to be formed will be more specifically described hereinafter by using recording paper and a recording film as examples.

The substrate which constitutes the recording paper or the recording film may be produced, by using machines such as a Fourdrinier paper machine and a cylinder paper machine, from chemical pulp such as LBKP or NBKP, mechanical pulp such as GP, PGW, RMP, TMP, CTMP, CMP or CGP, or wastepaper pulp such as DIP, to which known additives (such as a pigment, a binder, a sizing agent, a fixing agent, a cationizing agent, and a paper strength enhancer) is added in accordance with the necessity; synthetic paper; and plastic film sheets. The thickness of the substrate is desirably from 10 to 250 μm. The weight thereof is desirably from 10 to 250 g/m². An ink-receiving layer (and an optional back coat layer) may be provided directly onto the substrate, or a size press layer or an anchor coat layer made of starch or polyvinyl alcohol may be provided on the substrate before an ink-receiving layer (and an optional back coat layer) is provided thereon. The substrate may be subjected to flattening treatment by using a calendaring machine such as a machine calendar, a TG calendar, or a soft calendar.

In the invention, it is more preferable to use a coated sheet or coated plastic film wherein both surfaces of the substrate are laminated with polyolefin (such as polyethylene, polystyrene, polyethylene terephthalate, polybutene, or a copolymer thereof). It is also preferable to add, to the polyolefin, a white pigment (such as titanium oxide or zinc oxide) or a dye (such as cobalt blue, ultramarine blue, neodymium oxide).

In the case that the substrate has thereon an ink-receiving layer, the ink-receiving layer may includes a pigment and an aqueous binder. The pigment is preferably a white pigment, examples of which include inorganic white pigments such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide and zinc carbonate; organic pigments such as styrene-based pigments, acrylic pigments, urea resins, and melamine resins. Among these white pigments, porous inorganic pigments are preferable. Synthetic amorphous silica or the like having a large pore area is particularly preferable. As the synthetic amorphous silica, both silicic anhydride obtained by dry production process and hydrated silicic acid obtained by wet production method are usable. The use of hydrated silicic acid is preferable. Plural kinds of the above-mentioned pigments may be used in combination.

Examples of the aqueous binder in the ink-receiving layer include water-soluble polymers such as polyvinyl alcohol, silanol-modified polyvinyl alcohol, starch, cationized starch, casein, gelatin, carboxymethylcellulose, hydroxyethylcellulose, polyvinyl pyrrolidone, polyalkylene oxide and polyalkylene oxide derivatives; and water-dispersible polymers such as styrene butadiene latex and acryl emulsion. From the viewpoints of adhesiveness to the pigment and resistance against the peeling of the ink-receiving layer, polyvinyl alcohol and silanol-modified polyvinyl alcohol are particularly preferable. The aqueous binders may be used singly or in combination.

The ink-receiving layer may contain a water resistance enhancer, a light resistance improver, a surfactant, a hardening agent and other additives besides the above-mentioned pigment and aqueous binder.

EXAMPLES

Examples of the present invention will be described hereinafter. However, the invention is by no means limited to these examples.

Examples 1 to 6

-Production of Inks 101 to 106-

In 10 g of dimethylformamide, 2.0 g of the following pigment, 2.0 g of a hydrophobic polymer (n-butyl acrylate/N-vinylpyrrolidone/acrylic acid copolymer [copolymerization ratio (molar ratio)=55/40/5]), and the water-soluble polymer (compound represented by the general formula (I), the adding amount thereof being shown in Table 3) were dissolved. The resultant solution was added little by little to an aqueous solution obtained by adding 1.16 g of 10% sodium hydroxide aqueous solution to 89 g of water while the aqueous solution was stirred. In this way, pigment containing dispersion I was prepared. Each of MP-103 and MP-203 (manufactured by Kuraray Co., Ltd.) in Table 3) was added in the form of a 10% aqueous solution.

Pigment

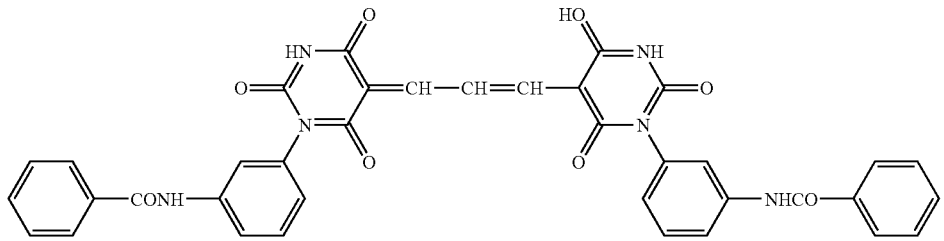

Next, 1000 g of water was added to the pigment containing dispersion I, and then ultrafiltration was repeated three times until 1000 g of the liquid flowed out. Thereafter, the remaining solution was filtrated with a filter having a mesh size of 0.4 μm, so as to yield pigment-containing fine particles dispersion II. At this time, the particle size of the dispersed particles in the pigment-containing fine particles dispersion II was measured with a Microtrac UPA 150 (manufactured by Honeywell Co.). As a result, the volume-average particle size thereof was 85 μm.

The pigment-containing fine particle dispersion II was used to produce ink-jet recording inks 101 to 106 of the invention, which had the following composition:

| | |
|---|---|
| the above-mentioned pigment-containing fine particle dispersion II: | 12.5 g, |
| ethylene glycol: | 1.3 g, |
| glycerin: | 1.3 g, |
| water: | such an amount that adjusted the whole mass of the ink to 25 g. |

TABLE 3

| | | Water-soluble polymer[*1] | | |
|---|---|---|---|---|
| | Ink | R[*2] | n[*2] | Added amount[*3] |
| Example 1 | 101 | $C_{12}H_{25}$ | 10 | 10 |
| Example 2 | 102 | $C_{12}H_{25}$ | 20 | 10 |
| Example 3 | 103 | $C_{14}H_{29}$ | 10 | 10 |
| Example 4 | 104 | MP-103[*4] | | 10 |
| Example 5 | 105 | $C_{12}H_{25}$ | 10 | 5 |
| Example 6 | 106 | MP-203[*4] | | 5 |
| Comparative Example 1 | 107 | — | | — |

[*1] compound represented by the general formula (I)
[*2] R and n represent R and n in the general formula (I) respectively.
[*3] percentage (% by mass) of the hydrophobic polymer with respect to the total amount of the hydrophobic polymer and the pigment.
[*4] MP-103 and MP-203 are polyvinyl alcohols each having an alkyl-modified terminals manufactured by Kuraray Co., Ltd.

Comparative Example 1

An ink-jet recording ink 107 as a comparative example was produced in the same way as in Example 1 except that no water-soluble polymer (compound represented by the general formula (I)) was used.

-Formation of Images and Evaluation-

Each of the ink-jet recording inks 101 to 107 produced as described above was put into a cartridge for black color of an ink-jet printer PM950C (manufactured by Seiko Epson Corp.). After the head-cleaning operation was carried out, each of the inks was allowed to stand still in the cartridge for one month. Thereafter, the printer was used, without the head-cleaning operation, to print an image on an ink-jet paper, photo glossy paper EX, manufactured by Fuji Photo Film Co., Ltd. At this time, the discharging stability and the image-forming property of each of the inks were evaluated on the following criterion:

A: The generation of a streak or ink-clogging was not observed at all.
B: Only a few streaks were generated in the resultant image.
C: Printing could be conducted. However, the resultant image blurred.
D: Ink-clogging occurred so that printing could not be conducted.

The results obtained by the evaluation are shown in Table 4.

TABLE 4

| | Ink | Discharging stability/ image forming property |
|---|---|---|
| Example 1 | 101 | A |
| Example 2 | 102 | A |
| Example 3 | 103 | A |
| Example 4 | 104 | A |
| Example 5 | 105 | A |
| Example 6 | 106 | A |
| Comparative Example 1 | 107 | C |

As shown in Table 4, each of the ink-jet recording inks 101 to 106 of the invention, each of which comprised, together with the pigment, the compound represented by the general formula (I) as a water-soluble polymer, had a good discharging stability after being stored for a long term. This result indicates that the ink-jet recording inks 101 to 106 of the invention has excellent dispersion stability at storage. No blur or streak was generated in the formed image. Thus, the quality of the image was good. On the other hand, in the ink-jet recording ink 107 as a comparative example, which did not comprise any water-soluble polymer, ink-clogging occured and only a blurred image was formed. In short, it appears that the ink-jet recording ink 107 had poor dispersion stability at long-term storage.

According to the invention, it is possible to provide an ink-jet recording ink which has a small particle size of dispersed particles, is excellent in dispersion stability so as to suppress the generation of ink-clogging in nozzles, and is also excellent in the point that generated ink-clogging is easily washed out.

The ink-jet recording ink according to the invention is used to provide an image forming method capable of forming a high-quality image stably without causing a deterioration of image quality or image formation failure that follows ink-discharging failure.

What is claimed is:

1. An ink-jet recording ink, comprising a pigment and a compound represented by the following General formula (I):

R—X—(Y)$_n$H             General formula (I)

wherein in General formula (I), R represents a hydrophobic group, or a group derived from a hydrophobic polymer; X represents a bivalent linking group having a hetero bond; n is an integer from 10 to 3500; and structural units of repeated Y comprise at least one structural unit represented by A, C or D, and further comprise 0 to 40% by mole of structural units represented by B:

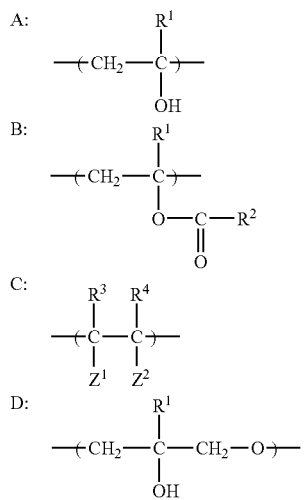

wherein in structural units A through D, $R^1$ represents a hydrogen atom or an alkyl group having 1 to 6 carbon atoms; $R^2$ represents a hydrogen atom or an alkyl group having 1 to 10 carbon atoms; $R^3$ represents a hydrogen atom or a methyl group; $R^4$ represents a hydrogen atom, —CH$_3$, —CH$_2$COOH or an ammonium salt thereof or alkali metal salt thereof, or —CN; $Z^1$ represents a hydrogen atom, —COOH or an ammonium salt thereof or alkali metal salt thereof, or —CONH$_2$; and $Z^2$ represents —COOH or an ammonium salt thereof or alkali metal salt thereof, —SO$_3$H or an ammonium salt thereof or alkali metal salt thereof, —OSO$_3$H or an ammonium salt thereof or alkali metal salt thereof, —CH$_2$SO$_3$H or an ammonium salt thereof or alkali metal salt thereof, —CONHC(CH$_3$)$_2$CH$_2$SO$_3$H or an ammonium salt thereof or alkali metal salt thereof, or —CONHCH$_2$CH$_2$CH$_2$N$^+$(CH$_3$)$_3$Cl$^-$.

2. An ink-jet recording ink according to claim 1, wherein the hydrophobic group represented by R in General formula (I) is an aliphatic group or an aromatic group.

3. An ink-jet recording ink according to claim 2, wherein the hydrophobic group represented by R in General formula (I) is an alicyclic group.

4. An ink-jet recording ink according to claim 2, wherein the hydrophobic group represented by R in General formula (I) is selected from the group consisting of alkyl, alkenyl, alkynyl, phenyl and naphthyl groups.

5. An ink-jet recording ink according to claim 4, wherein the hydrophobic group represented by R in General formula (I) is an alkyl group having 3 to 70 carbon atoms.

6. An ink-jet recording ink according to claim 1, wherein R in General formula (I) is a group derived from at least one hydrophobic polymer selected from the group consisting of polystyrene, polymethacrylic acid ester, polyacrylic acid ester, polyvinyl chloride, and derivatives thereof.

7. An ink-jet recording ink according to claim 5, wherein a polymerization degree of R in the General formula (I) is from 2 to 500.

8. An ink-jet recording ink according to claim 1, wherein the hetero bond in X in the General formula (I) is selected from the group consisting of an ether bond, an ester bond, a thioether bond, a thioester bond, a sulfonyl bond, an amide bond, an imide bond, a sulfonamide bond, a urethane bond, a urea bond, and a thiourea bond.

9. An ink-jet recording ink according to claim 1, wherein Y comprises a structural unit represented by A, and the structural unit A is a structural unit derived from vinyl alcohol, α-methylvinyl alcohol, or α-propylvinyl alcohol.

10. An ink-jet recording ink according to claim 1, wherein the structural unit B is a structural unit derived from vinyl acetate, vinyl formate, vinyl propionate, or an α-substitution product thereof.

11. An ink-jet recording ink according to claim 1, wherein Y comprises a structural unit C, and the structural unit C is a structural unit derived from acrylic acid, methacrylic acid, itaconic acid, maleic acid, an ammonium salt thereof or a metal salt thereof.

12. An ink-jet recording ink according to claim 1, wherein Y comprises a structural unit D, and the structural unit D is selected from the group consisting of —CH$_2$CH(OH)CH$_2$O—, —CH$_2$C(CH$_3$)(OH)CH$_2$O—, and —CH$_2$C(C$_2$H$_5$)(OH)CH$_2$O—.

13. An ink-jet recording ink according to claim 1, wherein a mass ratio of R to (Y)$_n$ in General formula (I) is from 0.01 to 2, the mass ratio being calculated using atomic weights of respective atoms in R and (Y)$_n$.

14. An ink-jet recording ink according to claim 1, wherein (Y)$_n$ in General formula (I) comprises, as a structural unit thereof, ethylene, propylene, isobutene, acrylonitrile, acrylamide, methacrylamide, N-vinylpyrrolidone, vinyl chloride or vinyl fluoride.

15. An ink-jet recording ink according to claim 1, further comprising water.

16. An ink-jet recording ink according to claim 1, further comprising an water-soluble organic solvent.

17. An ink-jet recording ink according to claim 1, further comprising a dispersing agent.

18. An ink-jet recording ink according to claim 1, further comprising a drying inhibitor.

19. An ink-jet recording ink according to claim 1, further comprising a penetration promoter.

20. An ink-jet recording ink according to claim 1, further comprising a high-boiling water-soluble solvent and a surface tension adjuster.

21. An ink-jet recording ink according to claim 1, which has a surface tension of 20 to 60 mN/m.

22. A method, comprising ejecting or discharging an ink-jet recording ink comprising a pigment and a compound represented by the following General formula (I) to form an image:

R—X—(Y)$_n$H             General formula (I)

wherein in General formula (I), R represents a hydrophobic group, or a group derived from a hydrophobic polymer; X represents a bivalent linking group having a hetero bond; n is an integer from 10 to 3500; and structural units of repeated Y comprise at least one structural unit represented by A, C or D, and further comprise 0 to 40% by mole of structural units represented by B:

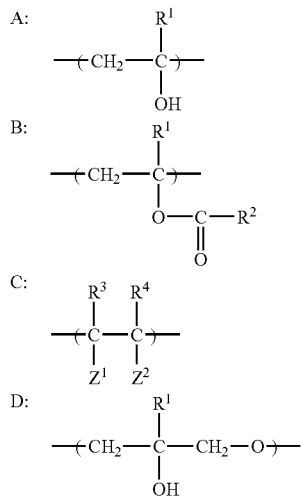

wherein in structural units A through D, $R^1$ represents a hydrogen atom or an alkyl group having 1 to 6 carbon atoms; $R^2$ represents a hydrogen atom or an alkyl group having 1 to 10 carbon atoms; $R^3$ represents a hydrogen atom or a methyl group; $R^4$ represents a hydrogen atom, —$CH_3$, —$CH_2COOH$ or an ammonium salt thereof or alkali metal salt thereof, or —CN; $Z^1$ represents a hydrogen atom, —COOH or an ammonium salt thereof or alkali metal salt thereof, or —$CONH_2$; and $Z^2$ represents —COOH or an ammonium salt thereof or alkali metal salt thereof, —$SO_3H$ or an ammonium salt thereof or alkali metal salt thereof, —$OSO_3H$ or an ammonium salt thereof or alkali metal salt thereof, —$CH_2SO_3H$ or an ammonium salt thereof or alkali metal salt thereof, —$CONHC(CH_3)_2CH_2SO_3H$ or an ammonium salt thereof or alkali metal salt thereof, or —$CONHCH_2CH_2CH_2N^+(CH_3)_3Cl^-$.

23. An image forming method according to claim 22, wherein the hydrophobic group represented by R in General formula (I) is an aliphatic group or an aromatic group.

* * * * *